United States Patent
Garmark et al.

(10) Patent No.: US 9,563,700 B2
(45) Date of Patent: Feb. 7, 2017

(54) CADENCE-BASED PLAYLISTS MANAGEMENT SYSTEM

(71) Applicant: Spotify AB, Stockholm (SE)

(72) Inventors: Sten Garmark, Stockholm (SE); Dariusz Dziuk, Stockholm (SE); Owen Smith, Stockholm (SE); Lars Christian Olofsson, Hägersten (SE); Nikolaos Toumpelis, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 14/883,298

(22) Filed: Oct. 14, 2015

(65) Prior Publication Data

US 2016/0342686 A1 Nov. 24, 2016

Related U.S. Application Data

(60) Provisional application No. 62/163,845, filed on May 19, 2015.

(51) Int. Cl.
*G06F 17/30* (2006.01)

(52) U.S. Cl.
CPC ... *G06F 17/30752* (2013.01); *G06F 17/30772* (2013.01); *G06F 17/30867* (2013.01)

(58) Field of Classification Search
None
See application file for complete search history.

(56) References Cited

U.S. PATENT DOCUMENTS

| | | | | |
|---|---|---|---|---|
| 7,705,230 B2* | 4/2010 | Bowen | ............ | G10H 1/40 84/612 |
| 8,254,829 B1* | 8/2012 | Kindred | ............ | G06F 17/30032 455/3.06 |
| 2007/0074617 A1* | 4/2007 | Vergo | ............ | G06F 17/30743 84/612 |
| 2007/0074618 A1* | 4/2007 | Vergo | ............ | G10H 1/00 84/612 |
| 2007/0074619 A1* | 4/2007 | Vergo | ............ | G10H 1/42 84/612 |
| 2008/0125172 A1* | 5/2008 | Leon | ............ | G10H 1/0083 455/557 |
| 2008/0319221 A1* | 12/2008 | Junker | ............ | C07C 233/18 560/170 |
| 2009/0139389 A1* | 6/2009 | Bowen | ............ | G10H 1/40 84/636 |

(Continued)

OTHER PUBLICATIONS

U.S. Appl. No. 14/883,340, filed Oct. 14, 2015 for "Cadence-Based Selection, Playback, and Transition Between Song Versions".

(Continued)

*Primary Examiner* — Hung Le
(74) *Attorney, Agent, or Firm* — Merchant & Gould P.C.

(57) ABSTRACT

A system for supporting a user's repetitive motion activity operates to manage cadence-based playlists identifying one or more media content items having a tempo corresponding to a user's cadence. The cadence-based playlists can be categorized by different tempi or tempo ranges that cover all likely cadences during the user's activities. A media-playback device is provided to acquire a user's cadence and retrieve a cadence-based playlist associated with a tempo or a tempo range corresponding to the cadence.

20 Claims, 10 Drawing Sheets

| PLAYLIST ID | TEMPO | GENRE | THEME | ERA | ... |
|---|---|---|---|---|---|
| 1 | 140-145 | TOP HITS | MORNING RUN | 90s | ... |
| 2 | 145-150 | TOP HITS | | | ... |
| 3 | 150-155 | TOP HITS | WARM-UP | | ... |
| 4 | 155-160 | TOP HITS | NIGHT RUN | 90s | ... |
| : | : | : | : | : | ... |
| 12 | 140-145 | COUNTRY | WALKING | 70s | ... |
| 13 | 145-150 | COUNTRY | | 80s | ... |
| 14 | 150-155 | COUNTRY | EVENING RUN | | ... |
| 15 | 155-160 | COUNTRY | JOGGING | | ... |
| : | : | : | : | : | ... |
| 23 | 140-145 | ROCK | AFTERNOON RUN | 90s | ... |
| 24 | 145-150 | ROCK | | | ... |
| 25 | 150-155 | ROCK | JOGGING | 2000s | ... |
| 26 | 155-160 | ROCK | WALKING | 2010s | ... |
| : | : | : | : | : | : |

(56) References Cited

U.S. PATENT DOCUMENTS

| | | | | |
|---|---|---|---|---|
| 2009/0319221 | A1* | 12/2009 | Kahn | A61B 5/1123 |
| | | | | 702/141 |
| 2010/0031805 | A1* | 2/2010 | Fratti | G10H 1/40 |
| | | | | 84/612 |
| 2010/0188405 | A1* | 7/2010 | Haughay, Jr. | A63B 24/0062 |
| | | | | 345/440 |
| 2011/0246508 | A1* | 10/2011 | Maekawa | G06F 17/30017 |
| | | | | 707/769 |
| 2013/0263719 | A1* | 10/2013 | Watterson | G10H 1/42 |
| | | | | 84/609 |
| 2013/0312589 | A1* | 11/2013 | MacPherson | G10H 1/42 |
| | | | | 84/612 |
| 2014/0115465 | A1* | 4/2014 | Lee | G06F 3/01 |
| | | | | 715/716 |
| 2014/0141396 | A1* | 5/2014 | Spratt | G10H 1/40 |
| | | | | 434/247 |
| 2014/0338516 | A1 | 11/2014 | Andri | |
| 2014/0357960 | A1* | 12/2014 | Phillips | A61B 5/486 |
| | | | | 600/301 |
| 2015/0081066 | A1* | 3/2015 | Yeh | A61B 5/4815 |
| | | | | 700/94 |
| 2015/0142147 | A1* | 5/2015 | Stanghed | G06F 17/30743 |
| | | | | 700/94 |
| 2016/0196345 | A1* | 7/2016 | Kreifeldt | G06F 17/30601 |
| | | | | 707/738 |

OTHER PUBLICATIONS

U.S. Appl. No. 14/883,252, filed Oct. 14, 2015 for "Repetitive Motion Activity Enhancement Based Upon Media Content Selection".
U.S. Appl. No. 14/883,245, filed Oct. 14, 2015 for "Heart Rate Control Based Upon Media Content Selection".
U.S. Appl. No. 14/883,232, filed Oct. 14, 2015 for "Cadence Determination and Media content Selection".
U.S. Appl. No. 14/883,336, filed on Oct. 14, 2015 for "Selection and Playback of Song Versions Using Cadence".
U.S. Appl. No. 14/883,273, filed Oct. 14, 2015 for "Multi-Track Playback of Media content During Repetitive Motion Activities".
U.S. Appl. No. 14/883,295, filed Oct. 14, 2015 for "Search Media Content Based Upon Tempo".
U.S. Appl. No. 14/883,318, filed Oct. 14, 2015 for "Cadence and Media Content Phase Alignment".
U.S. Appl. No. 14/944,972, filed Nov. 18, 2015 for "System for Managing Transitions Between Media Content Items".
U.S. Appl. No. 14/945,008, filed Nov. 18, 2015 for "Identifying Media Content".
U.S. Appl. No. 14/883,323, filed Oct. 14, 2015 for "Accessibility Management System for Media Content Items".
International Search Report and Written Opinion from International Patent Application No. PCT/EP2016/061049, mailed Jul. 4, 2016.

* cited by examiner

CADENCE-BASED PLAYLISTS MANAGEMENT SYSTEM

CROSS-REFERENCE TO RELATED APPLICATION

This application claims priority to U.S. Ser. No. 62/163,845, filed on May 19, 2015, and entitled CADENCE-BASED PLAYLISTS MANAGEMENT SYSTEM, the disclosure of which is hereby incorporated by reference in its entirety.

BACKGROUND

Running, as well as many other recreation or fitness activities, includes repetitive motions. For example, running and walking involve repetitive steps, biking involves repetitive rotational movements, rowing involves repetitive strokes, and swimming involves repetitive strokes and kicks. There are of course many other recreation and fitness activities that also include various repetitive motions. These repetitive motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, audiobooks, etc. Examples of video content include movies, music videos, television episodes, etc. Using a mobile phone or other media-playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity.

SUMMARY

In general terms, this disclosure is directed to a cadence-based playlists management system. In one possible configuration and by non-limiting example, the system operates to generate cadence-based playlists associated with different tempo ranges to support a user's repetitive motion activity. Various aspects are described in this disclosure, which include, but are not limited to, the following aspects.

One aspect is a method of automatically playing back one or more media content items to support a repetitive motion activity. The method may include acquiring, using at least one computing device, a user's cadence; retrieving, using the at least one computing device, a playlist associated with the cadence; and playing back the playlist on the at least one computing device.

Another aspect is a method of generating cadence-based playlists to support a repetitive motion activity. The method may include creating a plurality of cadence-based playlists, the plurality of cadence-based playlists associated with different tempo ranges, respectively; identifying tempi of the media content items; and associating the media content items with the plurality of cadence-based playlists, respectively, based on the tempi of the media content items, each cadence-based playlist including one or more of the media content items with the tempi of the one or more of the media content items within the tempo range of that playlist.

Yet another aspect is a computer-readable storage medium comprising software instructions that, when executed, cause one or more computing devices to acquire a user's cadence; retrieve a playlist associated with the cadence, the playlist associated with a tempo range corresponding to the user's cadence, and the playlist including one or more media content items with tempi of the media content items within the tempo range of the playlist; and play back the playlist on the one or more computing devices.

DETAILED DESCRIPTION

Figure 1:
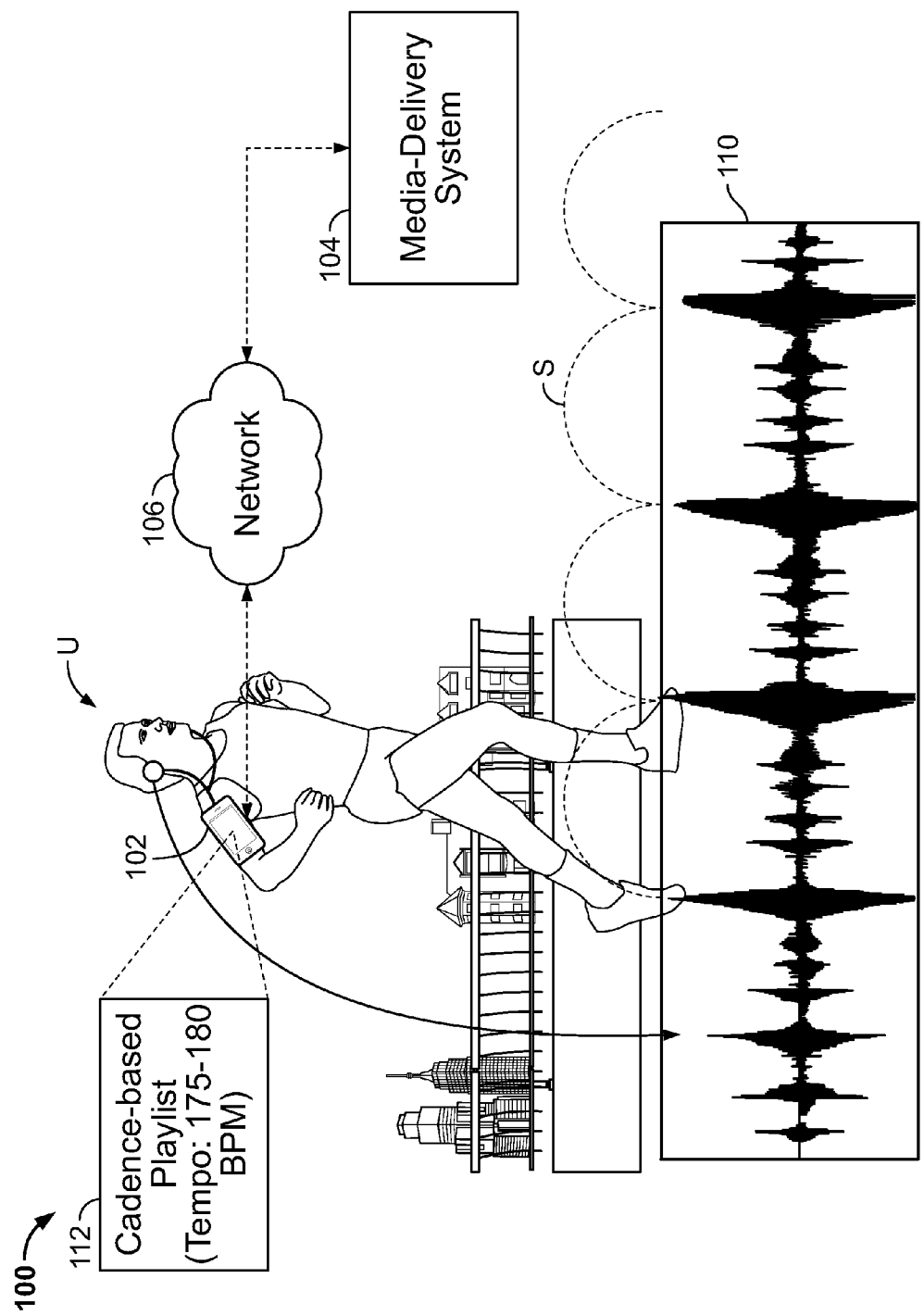
FIG. 1 illustrates an example system for managing cadence-based playlists.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Users of media-playback devices often consume media content while engaging in various activities, including repetitive motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media-playback devices and media-delivery systems.

In general, the present disclosure is directed to a system for managing cadence-based playlists identifying one or more media content items to support a user's repetitive motion activity. The cadence-based playlists are created to identify media content items having a tempo corresponding to a user's cadence. The cadence-based playlists can be categorized by different tempo ranges that cover all likely cadences during the user's activities. A media content item can be added to a cadence-based playlist when a tempo of the media content item falls within a tempo range associated with the cadence-based playlist. A media-playback device is provided to acquire a user's cadence and retrieve a cadence-based playlist associated with a tempo or a tempo range corresponding to the cadence. The media-playback device operates to play back the retrieved cadence-based playlist while the user performs the repetitive motion activity.

FIG. 1 illustrates an example system 100 for managing cadence-based playlists. The example system 100 includes a media-playback device 102 and a media-delivery system 104. The system 100 communicates across a network 106. Also shown are a user U who is running, and one or more cadence-based playlists 112. The user U's upcoming steps S are shown as well. A step represents a single strike of the runner's foot upon the ground.

The media-playback device 102 operates to play one or more cadence-based playlists 112 to produce media output 110. In some embodiments, the cadence-based playlists 112 contains a list of media content items that are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof The media-playback device 102 plays back the cadence-based playlists 112 for the user based on the user's cadence. In the example shown, the media output 110, which is generated by playing back the media content items contained in the cadence-based playlist 112, includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media-playback device 102 may play a cadence-based playlist 112 containing one or more media content items having a tempo equal to or approximately equal to 180 BPM. In other embodiments, the media-playback device 102 plays a cadence-based playlist 112 containing one or more media content items having a tempo equal or approximately equal to the result of dividing the cadence by an integer such as a tempo that is equal to or approximately equal to one-half (e.g., 90 BPM when the user is running at a cadence of 180 steps per minute), one-fourth, or one-eighth of the cadence. Alternatively, the media-playback device 102 plays a cadence-based playlist 112 containing one or more media content items having a tempo that is equal or approximately equal to an integer multiple (e.g., 2×, 4×, etc.) of the cadence. Further, in some embodiments, the media-playback device 102 operates to play multiple media content items including one or more media content items having a tempo equal to or approximately equal to the cadence and one or more media content items have a tempo equal or approximately equal to the result of multiplying or dividing the cadence by an integer. Various other combinations are possible as well.

As described herein, the cadence-based playlist 112 includes a list of one or more media content items (e.g., music) having a tempo that is within a predetermined range of a target tempo. In at least some embodiments, the predetermined range is plus or minus 2.5 BPM. For example, if the user U is running at a cadence of 180 steps per minute, the media-playback device 102 operates to play a cadence-based playlist 112 containing a list of media content items having a tempo of 177.5-182.5 BPM. Alternatively, in other embodiments, the predetermined range is itself in a range from 1 BPM to 10 BPM. Other ranges of a target tempo are also possible.

Further, in some embodiments, the media content items that are played back on the media-playback device 102 have a tempo equal to or approximately equal to a user U's cadence after it is rounded. For example, the cadence may be rounded to the nearest multiple of 2.5, 5, or 10 and then the media-playback device 102 plays a cadence-based playlist 112 with media content items having a tempo equal to or approximately equal to the rounded cadence. As described herein, the media-playback device 102 uses the cadence to select a cadence-based playlist 112 with a predetermined tempo range of music for playback. For example, if the user U's cadence is 181 steps per minute, the media-playback device 102 may operate to play a cadence-based playlist 112 from a predetermined tempo range of 180-184.9 BPM; while if the user U's cadence is 178 steps per minute, the media-playback device 102 may operate to play a cadence-based playlist 112 from a predetermined tempo range of 175-179.9 BPM.

Figure 2:
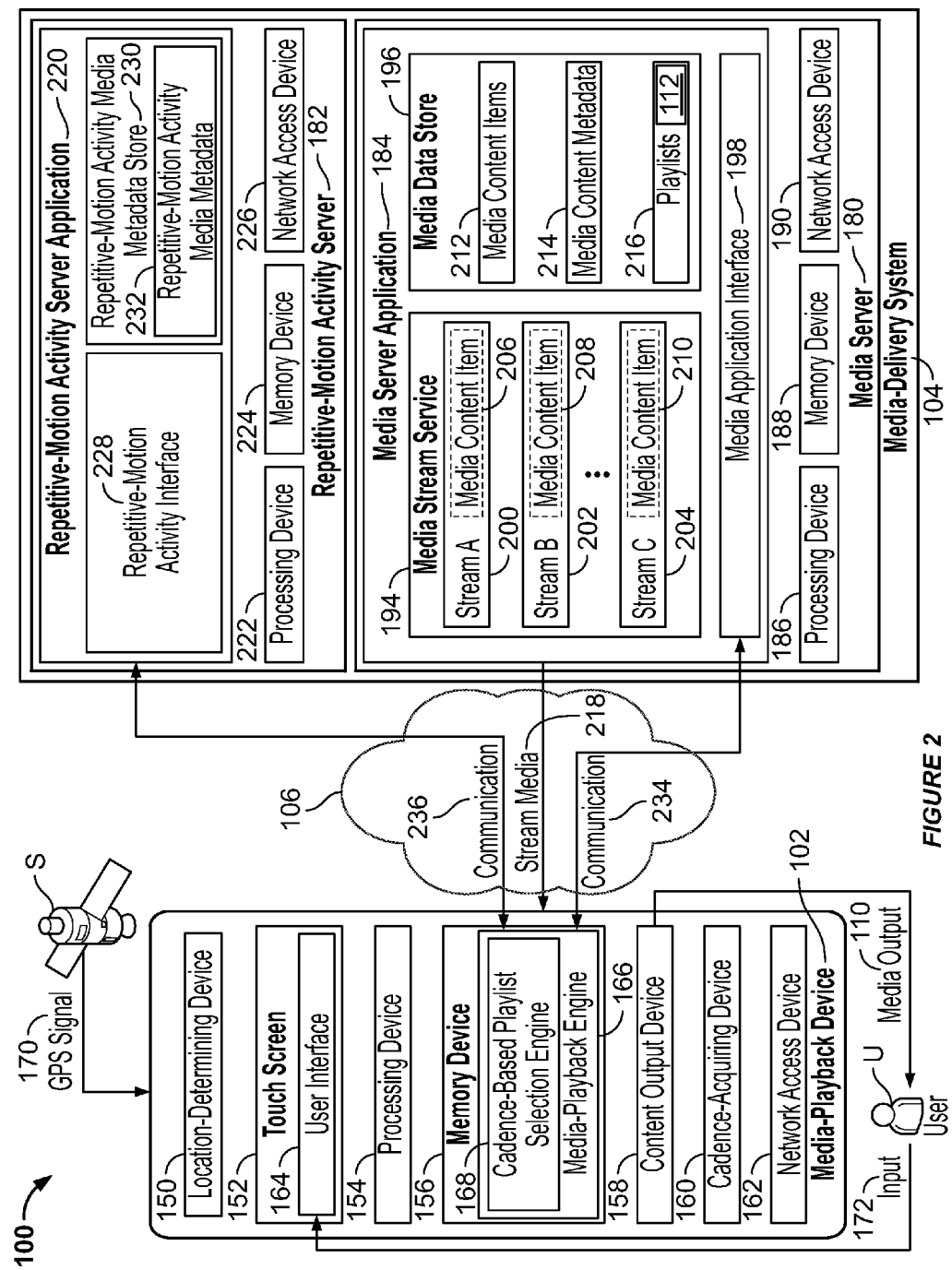
FIG. 2 is a schematic illustration of an example system for managing cadence-based playlists.

FIG. 2 is a schematic illustration of an example system 100 for managing cadence-based playlists. In FIG. 2, the media-playback device 102, the media-delivery system 104, and the network 106 are shown. Also shown are the user U and a satellite S.

As noted above, the media-playback device 102 operates to play media content items. In some embodiments, the media-playback device 102 operates to play media content items that are provided (e.g., streamed, transmitted, etc.) by a system external to the media-playback device such as the media-delivery system 104, another system, or a peer device. Alternatively, in some embodiments, the media-playback device 102 operates to play media content items stored locally on the media-playback device 102. Further, in at least some embodiments, the media-playback device 102 operates to play media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is a laptop computer, desktop computer, television, gaming console, set-top box, network appliance, blue-ray or DVD player, media player, stereo, or radio.

In at least some embodiments, the media-playback device 102 includes a location-determining device 150, a touch screen 152, a processing device 154, a memory device 156, a content output device 158, a cadence-acquiring device 160, and a network access device 162. Other embodiments may include additional, different, or fewer components. For example, some embodiments may include a recording device such as a microphone or camera that operates to record audio or video content. As another example, some embodiments do not include one or more of the location-determining device 150 and the touch screen 152.

The location-determining device 150 is a device that determines the location of the media-playback device 102. In some embodiments, the location-determining device 150 uses one or more of the following technologies: Global Positioning System (GPS) technology which may receive GPS signals 170 from satellites S, cellular triangulation technology, network-based location identification technology, Wi-Fi positioning systems technology, and combinations thereof.

The touch screen 152 operates to receive an input 172 from a selector (e.g., a finger, stylus etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 164 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 166 that includes a cadence-based playlist selection engine 168.

The memory device 156 typically includes at least some form of computer-readable media. Computer readable media include any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker, an audio output jack, a Bluetooth transmitter, a display panel, and a video output jack. Other embodiments are possible as well. For example, the content output device 158 may transmit a signal through the audio output jack or Bluetooth transmitter that can be used to reproduce an audio signal by a connected or paired device such as headphones or a speaker.

The cadence-acquiring device 160 operates to acquire a cadence associated with the user U. In at least some embodiments, the cadence-acquiring device 160 operates to determine cadence directly and includes one or more accelerometers or other motion-detecting technologies. Alternatively, the cadence-acquiring device 160 operates to receive data representing a cadence associated with the user U. For example, in some embodiments, the cadence-acquiring device 160 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 160 operates to receive a cadence value input by the user U or another person.

The network access device 162 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media-playback engine 166 operates to play back one or more of the media content items (e.g., music) to encourage the running of the user U. As described herein, the media-playback engine 166 is configured to communicate with the media-delivery system 104 to receive one or more media content items (e.g., through the stream media 218) based on a cadence detected by the cadence-acquiring device 160. In other embodiments, the media-playback engine 166 is configured to playback one or more media content items that are locally stored in the media-playback device 102.

The cadence-based playlist selection engine 168 operates to retrieve one or more cadence-based playlists 112 based on a cadence of the user U acquired by the media-playback device 102. An example operation of the cadence-based playlist selection engine 168 is illustrated and described in more detail with reference to FIGS. 3-10.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

The media-delivery system 104 comprises one or more computing devices and operates to provide media content items to the media-playback devices 102 and, in some embodiments, other media-playback devices as well. The media-delivery system 104 includes a media server 180 and a repetitive-motion activity server 182. In at least some embodiments, the media server 180 and the repetitive-motion activity server 182 are provided by separate computing devices. In other embodiments, the media server 180 and the repetitive-motion activity server 182 are provided by the same computing devices. Further, in some embodiments, one or both of the media server 180 and the repetitive-motion activity server 182 are provided by multiple computing devices. For example, the media server 180 and the repetitive-motion activity server 182 may be provided by multiple redundant servers located in multiple geographic locations.

The media server 180 operates to transmit stream media 218 to media-playback devices such as the media-playback device 102. In some embodiments, the media server 180 includes a media server application 184, a processing device 186, a memory device 188, and a network access device 190. The processing device 186, memory device 188, and network access device 190 may be similar to the processing device 154, memory device 156, and network access device 162 respectively, which have each been previously described.

In some embodiments, the media server application 184 operates to stream music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 166.

In some embodiments, the media data store 196 stores media content items 212, media content metadata 214, and playlists 216. The media data store 196 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. Examples of the playlists 216 is illustrated and described in more detail with respect to FIGS. 5-7.

The repetitive-motion activity server 182 operates to provide repetitive-motion activity-specific information about media content items to media-playback devices. In some embodiments, the repetitive-motion activity server 182 includes a repetitive-motion activity server application 220, a processing device 222, a memory device 224, and a network access device 226. The processing device 222, memory device 224, and network access device 226 may be similar to the processing device 154, memory device 156, and network access device 162 respectively, which have each been previously described.

In some embodiments, repetitive-motion activity server application 220 operates to transmit information about the suitability of one or more media content items for playback during a particular repetitive-motion activity. The repetitive-motion activity server application 220 includes a repetitive-motion activity interface 228 and a repetitive-motion activity media metadata store 230.

In some embodiments, the repetitive-motion activity server application 220 may provide one or more cadence-based playlists 112 at a particular tempo (or a particular range of tempo) to a media-playback device in response to a request that includes a particular cadence value. Further, in some embodiments, the media content items included in the returned list will be particularly relevant for the repetitive motion activity in which the user is engaged (for example, if the user is running, the returned list of media content items may include only media content items that have been identified as being highly runnable).

The repetitive-motion activity interface 228 operates to receive requests or other communication from media-playback devices or other systems to retrieve information about media content items from the repetitive-motion activity server 182. For example, in FIG. 2, the repetitive-motion activity interface 228 receives communication 236 from the media-playback engine 166.

In some embodiments, the repetitive-motion activity media metadata store 230 stores repetitive-motion activity media metadata 232. The repetitive-motion activity media metadata store 230 may comprise one or more databases and file systems. Other embodiments are possible as well.

The repetitive-motion activity media metadata 232 operates to provide various information associated with media content items, such as the media content items 212. In some embodiments, the repetitive-motion activity media metadata 232 provides information that may be useful for selecting media content items for playback during a repetitive-motion activity. For example, in some embodiments, the repetitive-motion activity media metadata 232 stores runnability scores for media content items that corresponds to the suitability of particular media content items for playback during running. As another example, in some embodiments, the repetitive-motion activity media metadata 232 stores timestamps (e.g., start and end points) that identify portions of a media content items that are particularly well-suited for playback during running (or another repetitive-motion activity).

As described herein, some embodiments of the repetitive-motion activity media metadata 232 include information about the cadence-based playlists 112 associated with different tempo ranges. An example of such repetitive-motion activity media metadata 232 is illustrated and described in more detail with reference to FIG. 9.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for a cadence-based playlists management system, other embodiments are possible as well. For example, in some embodiments, the media-playback device 102 includes a media data store 196 and the media-playback device 102 is configured to perform cadence-based playlists management without accessing the media-delivery system 104. Further in some embodiments, the media-playback device 102 operates to store previously streamed media content items in a local media data store.

In at least some embodiments, the media-delivery system 104 can be used to stream, progressively download, or otherwise communicate music, other audio, video, or other forms of media content items to the media-playback device 102 based on a cadence acquired by the cadence-acquiring device 160 of the media-playback device 102. In accordance with an embodiment, a user U can direct the input 172 to the user interface 164 to issue requests, for example, to playback media content corresponding to the cadence of a repetitive motion activity on the media-playback device 102.

Figure 3:
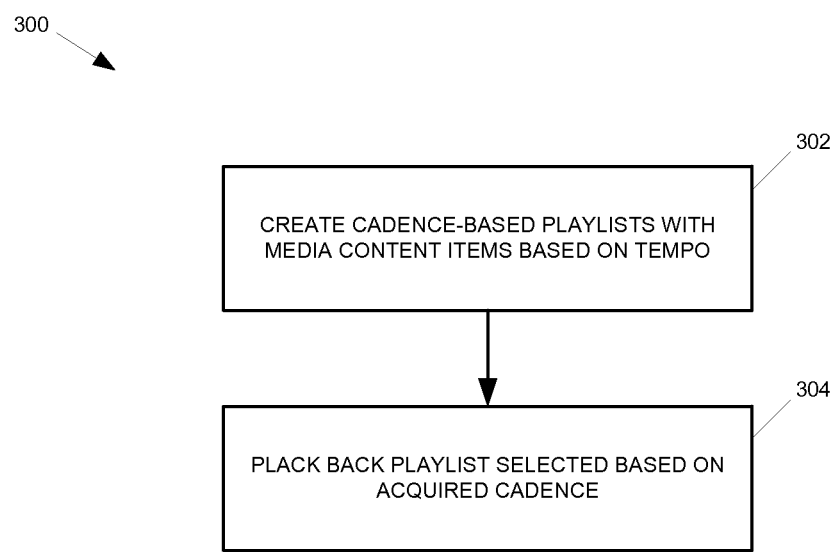
FIG. 3 illustrates an example method of managing cadence-based playlists with the system of FIG. 2.

FIG. 3 illustrates an example method 300 of managing cadence-based playlists with the system 100. In some embodiments, the method 300 includes operations 302 and 304.

At the operation 302, one or more cadence-based playlists 112 are created to identify one or more media content items that are selected based on tempo thereof. An example of the operation 302 is described in more detail with reference to FIG. 4.

At the operation 304, the media-playback device 102 operates to acquire a user's cadence and select one or more of the cadence-based playlists 112 for playback. An example of the operation 304 is described in more detail with reference to FIG. 10.

Figure 4:
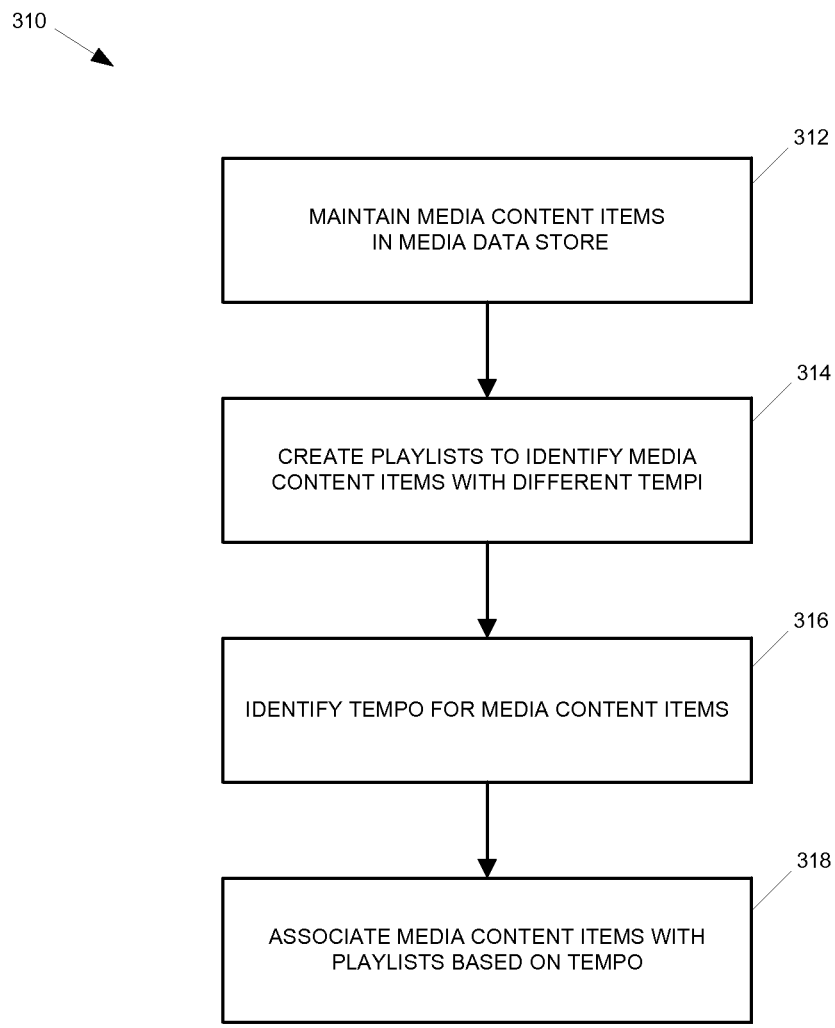
FIG. 4 illustrates an example method for performing an operation of FIG. 3.

FIG. 4 illustrates an example method 310 for performing the operation 302 of FIG. 3. In some embodiments, the method 310 includes operations 312, 314, 316, and 318.

In other embodiments, the operations of the method 310 can be performed in different orders. In yet other embodiments, the method 310 includes additional operations. In yet other embodiments, the method 310 includes only one or some of the operations 312, 314, 316, and 318.

At the operation 312, one or more media content items are maintained in the media data store 196 of the media server 180.

At the operation 314, one or more cadence-based playlists 112 are created to identify media content items with different tempi. For example, a cadence-based playlist 112 is configured with a tempo of 150 BPM so that a media content item having the same tempo (or a tempo similar to 150 BPM) is identified by that playlist 112. In other embodiments, the cadence-based playlists 112 are characterized with different ranges of tempo so that one or more media content items having a tempo within a particular range of tempo are identified by the cadence-based playlists 112 associated with that range of tempo. For example, where a cadence-based playlist 112 is characterized to have a range of 150-155 BPM, one or more media content items having a tempo between 150-155 BPM are to be identified by the cadence-based playlist 112.

At the operation 316, the media content items are analyzed to identify a tempo thereof. A tempo of a media content item can be determined in various known manners. In the example of songs, a tempo of a song can be relatively easily identified because songs typically have a steady tempo throughout their entire playing time. Where a tempo changes significantly throughout a song, in some embodiments, such variations in tempo can be averaged to represent a single tempo of the song. In other examples, a portion of the song having an approximately constant tempo can be identified, and such a constant tempo can be used as a tempo for the entire song. In yet other examples, the portion of the song having an approximately constant tempo is taken and used to replace the entire song while the other portion of the song, which has variable tempo, are excluded from playback. Other methods of obtaining a tempo of a song are also possible.

At the operation 318, the media content items are associated with the cadence-based playlists 112 based on tempo. By way of example, a media content item having a tempo of 132 BPM is associated with a cadence-based playlist 112 characterized with a tempo range of 130-135 BPM so that the cadence-based playlist 112 with the range of 130-135 BPM identifies the media content item having 132 BPM for playback.

Figure 5:
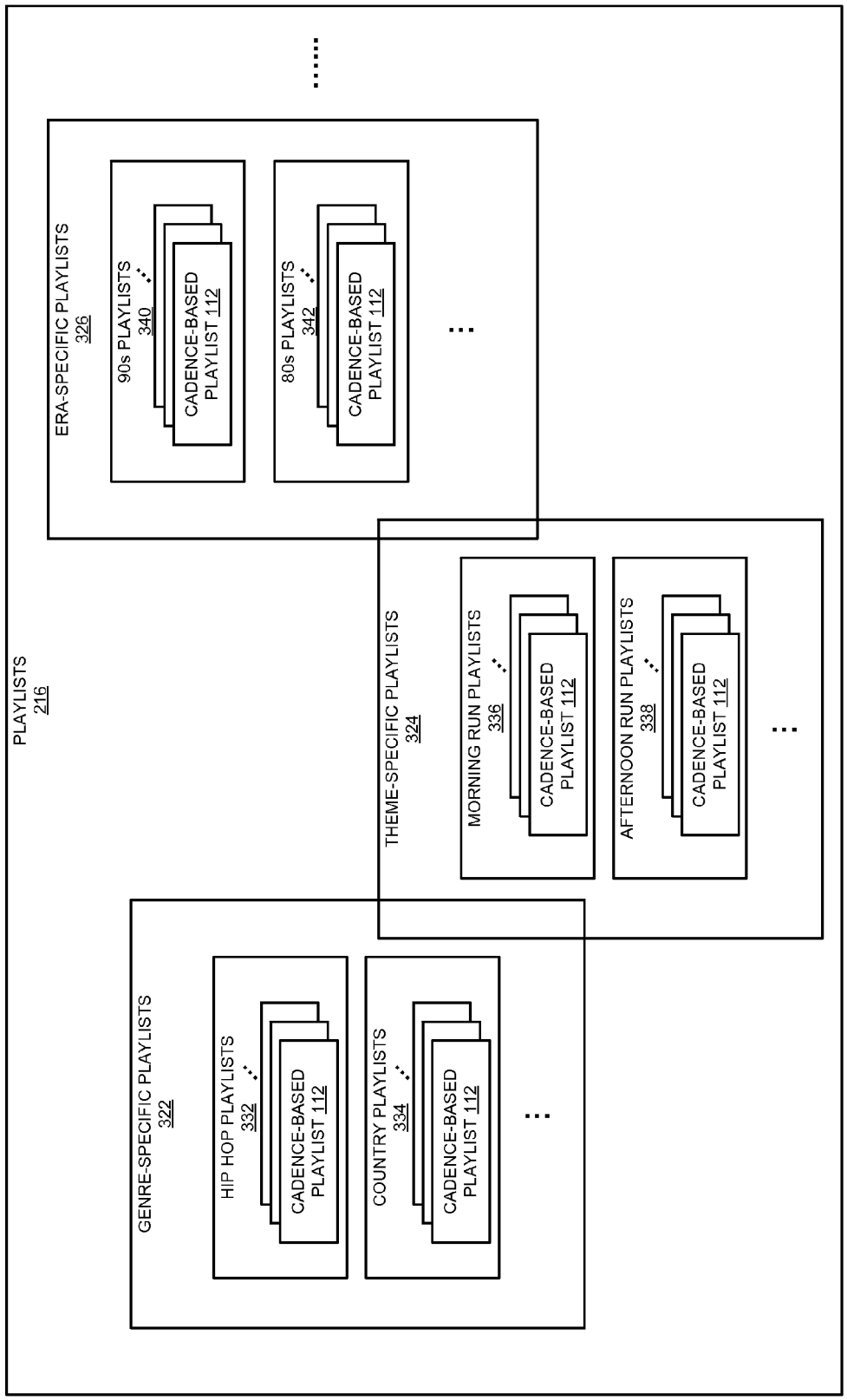
FIG. 5 schematically illustrates an example playlist maintained in a media-delivery system of FIG. 2.
Figure 6:
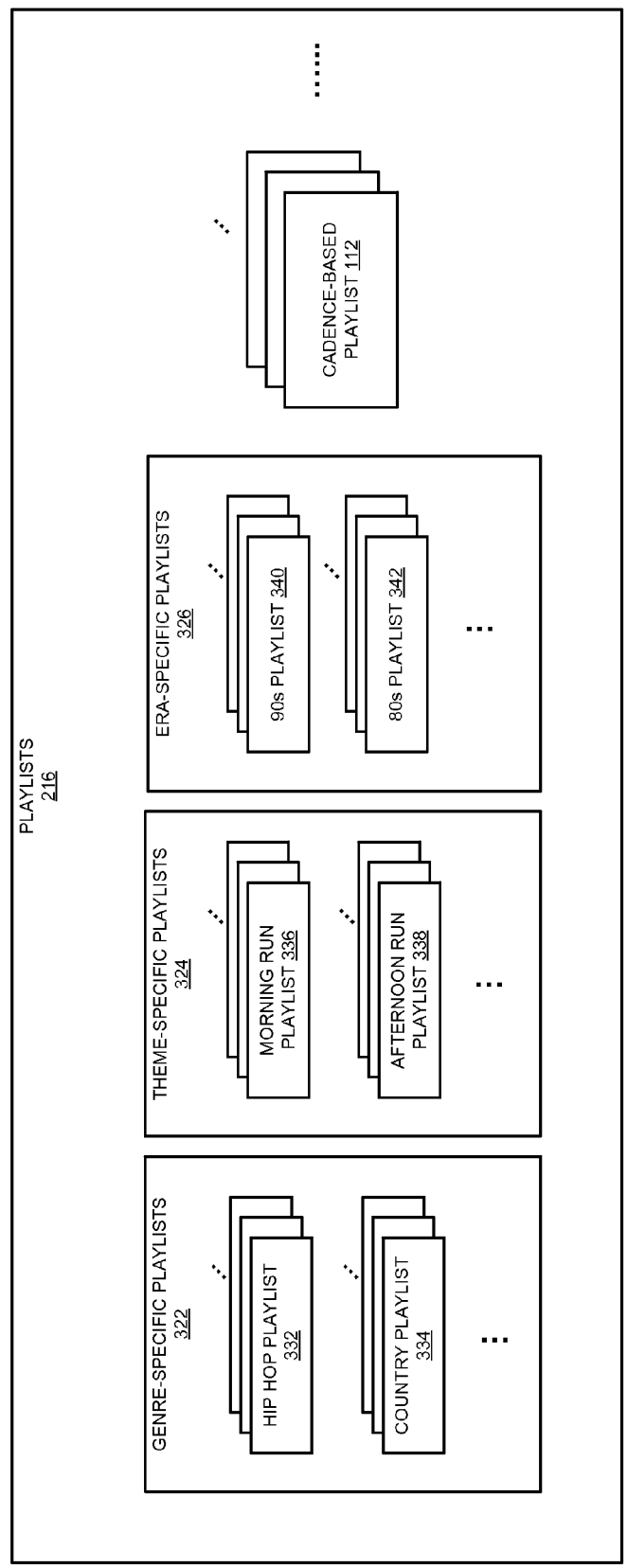
FIG. 6 schematically illustrates another example playlist maintained in a media-delivery system of FIG. 2.
Figure 7:
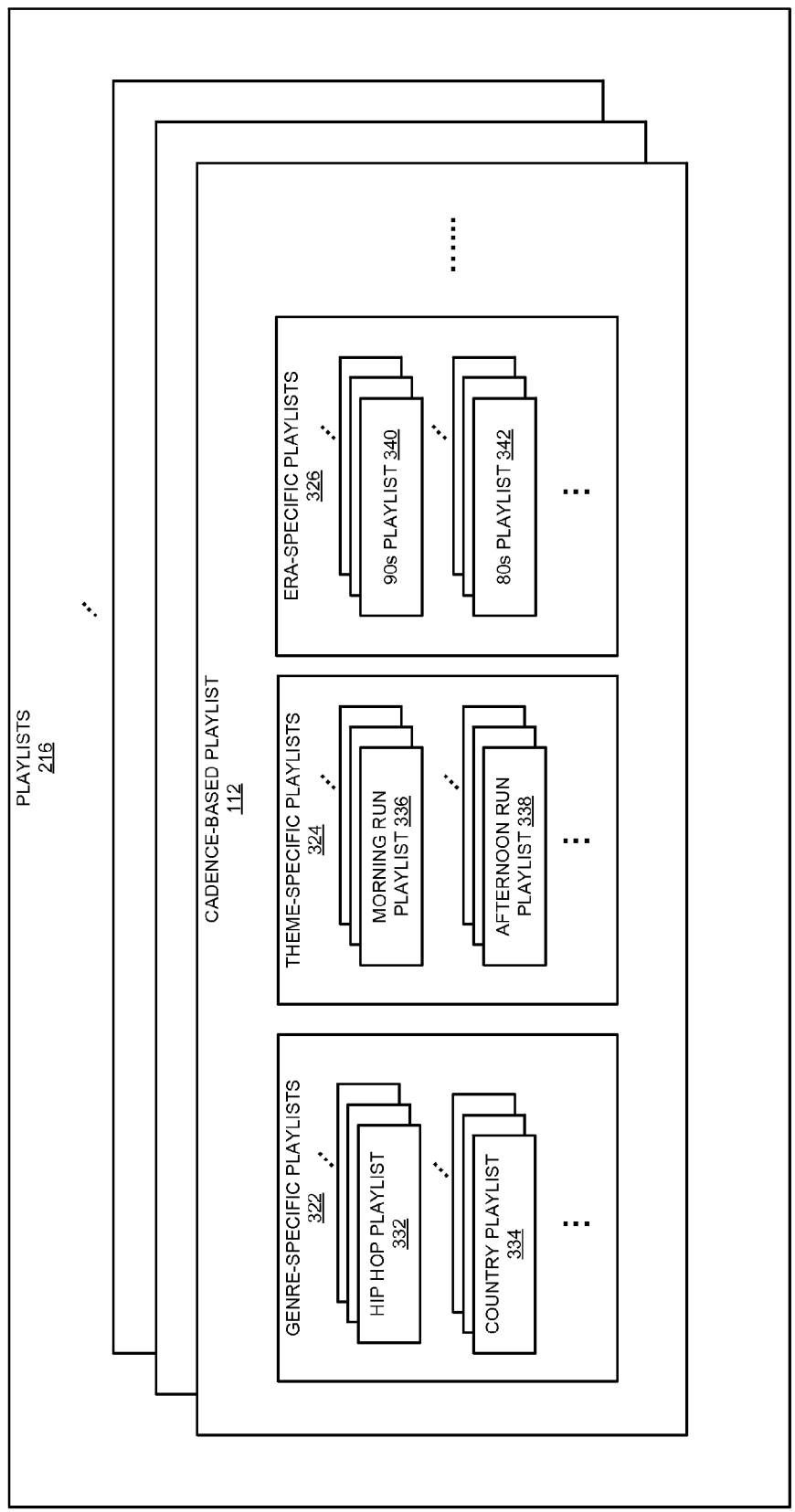
FIG. 7 schematically illustrates yet another example playlist maintained in a media-delivery system of FIG. 2.

Referring to FIGS. 5-7, examples of the playlists 214 are described with different structures. In particular, FIG. 5 schematically illustrates an example of the playlists 214 maintained in the media-delivery system 104, FIG. 6 schematically illustrates another example of the playlists 214, and FIG. 7 schematically illustrates yet another example of the playlists 214. In these examples, the cadence-based playlists 112 are included in the playlists 214.

As illustrated in FIGS. 5-7, in some embodiments, the playlists 216 can be categorized by different characteristics so that at least some of the playlists 216 are grouped into one or more sets of playlists. In the illustrated example, the playlists 216 includes a set of genre-specific playlists 322, a set of theme-specific playlists 324, a set of era-specific playlists 326, and other sets of playlists with suitable characteristics. In other embodiments, the playlists 216 include playlists created by users for various purposes, such as personal use or sharing.

The genre-specific playlists 322 are configured to identify media content items characterized with different genres, such as hip hop, pop, country, electronic, folk, R&B and soul, rock, Latin, African, Asian, Avant-garde, blues, comedy, and any other genres. In the illustrated example, the genre-specific playlists 322 include a subset of hip hop playlists 332, a subset of country playlists 334, and other subsets of playlists with suitable genre-related characteristics. In some embodiments, as illustrated in FIG. 5, each of the subsets of genre-related playlists (including subsets of playlists 332 and 334) includes one or more cadence-based playlists 112.

The theme-specific playlists 324 are configured to identify media content items characterized with different themes of a repetitive motion activity. The themes of activity can be categorized by time, place, speed, type, and/or any other suitable conditions. By way of example, the themes of running can be divided into morning run, afternoon run, evening run, and night run (by time), into riverside run, beachside run, mountain run, rural run, and city run (by place), or into sprinting, jogging, and walking (by speed). In the illustrated example, the theme-specific playlists 324 include a subset of morning run playlists 336, a subset of afternoon run playlists 338, and other subsets of playlists with suitable theme-related characteristics. In some embodiments, as illustrated in FIG. 5, each of the subsets of theme-related playlists (including subsets of playlists 336 and 338) includes one or more cadence-based playlists 112.

The era-specific playlists 326 are configured to identify media content items characterized with different eras. By way of examples, songs can be divided into different eras, such as 50s, 60s, 70s, 80s, 90s, 2000s, and 2010s. In the illustrated example, the era-specific playlists 326 include a subset of 90s playlists 340, a subset of 80s playlists, and other subsets of playlists of different eras. In some embodiments, as illustrated in FIG. 5, each of the subsets of era-related playlists (including subsets of playlists 340 and 342) includes one or more cadence-based playlists 112.

In some embodiments, at least one media content item can be identified by a plurality of playlists of the same characteristic. In other embodiments, at least one media content item can be identified by a plurality of playlists of different characteristics. In yet other embodiments, at least one media content item can be identified exclusively by a single playlist.

In some embodiments, as illustrated in FIG. 5, the playlists 216 are organized hierarchically with the cadence-based playlists 112 contained in the subsets of playlists (such as 332, 334, 336, 338, 340, and 342). In other embodiments, it is also possible to differently categorize the playlists 216 including the cadence-based playlists 112. In some examples, as illustrated in FIG. 6, the cadence-based playlists 112 are organized in parallel with other playlists (e.g., the genre-specific playlists 332, the theme-specific playlists 324, and the era-specific playlists 326) of different characteristics. In other examples, as illustrated in FIG. 7, the cadence-based playlists 112 are organized to include one or more subsets of playlists (e.g., the genre-specific playlists 332, the theme-specific playlists 324, and the era-specific playlists 326) of different characteristics.

Figure 8:
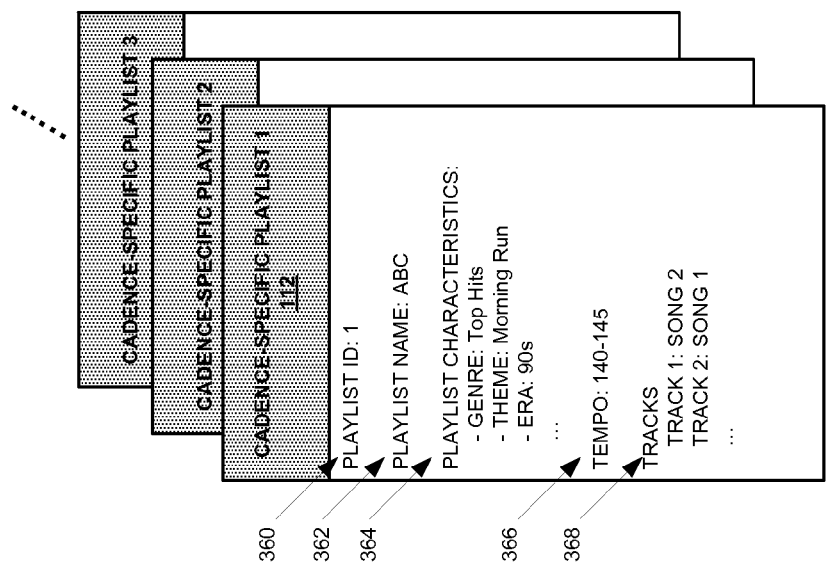
FIG. 8 illustrates an example structure of a cadence-based playlist.

FIG. 8 illustrates an example structure of the cadence-based playlist 112. In some embodiments, the cadence-based playlist 112 includes various attributes, such as a playlist ID 360, a playlist name 362, playlist characteristics 364, a tempo range 366, and a list of tracks 368. In other embodiments, the cadence-based playlist 112 can include other attributes. In yet other embodiments, the cadence-based playlist 112 can include only some of the illustrated attributes, either in addition to other attributes or without additional attributes.

The playlist ID 360 is used to identify a cadence-based playlist 112 associated with the playlist ID 360.

The playlist name 362 represents the name of the cadence-based playlist 112. In some embodiments, the playlist name 362 is displayed on the media-playback device 102 so that the user U identifies the cadence-based playlist 112 for various operations, such as playing back the cadence-based playlist 112. In some embodiments where the cadence-based playlists 112 are categorized within parent playlists, such as the characteristic-related playlists (e.g. the genre-specific playlists 322, the theme-specific playlists 324, and the era-specific playlists 326) as illustrated in FIG. 5, the cadence-based playlists 112 do not need to have the playlist name 326 because the cadence-based playlists 112 can be identified by their parent playlist's names.

The playlist characteristics 364 are used to identify various characteristics of the cadence-based playlist 112. As described above, examples of such characteristics include genres, themes, eras, and other suitable characteristics of playlists or media content items.

The tempo range 366 is configured to identify a range of tempo associated with the cadence-based playlist 112. Based on the tempo range 366, the cadence-based playlist 112 is configured to identify one or more media content items having a tempo that falls within the tempo range 366. In other embodiments, the cadence-based playlist 112 has a single value of tempo, and is configured to identify one or more media content items having the same or similar tempo.

The tempo range 366 can be determined in various manners. In some embodiments, the tempo ranges 366 are defined at predetermined intervals. By way of example, the tempo ranges 366 can increase by 5 BPM (e.g., 130-135, 135-140, 140-145, 145-150, 150-155, 155-160, etc.). In other examples, the tempo ranges 366 are set by 10 BPM (e.g., 130-140, 140-150, 150-160, etc.). Other intervals are also possible. In some embodiments, the tempo ranges 366 are determined to cover all possible cadences during user's repetitive motion activities (e.g., running).

The list of tracks 368 identifies one or more media content items to be played back when the cadence-based playlist 112 is selected based on a user's cadence. The media content items contained in the list of tracks 368 of the cadence-based playlist 112 have a tempo that falls within the tempo range 366 of the cadence-based playlist 112. In some embodiments, a number of media content items that are identified by the cadence-based playlist 112 is determined to be sufficient to play back during the entire repetitive motion activity by a user. For example, a cadence-based playlist 112 is configured to contain a sufficient number of tracks (e.g., 10, 15, or 20 tracks) to play about an hour. In other examples, a cadence-based playlist 112 is designed to play back more than an hour. In yet other examples, a cadence-based playlist 112 is configured to play back less than an hour.

In some embodiments, a user U can manually edit a cadence-based playlist 112 to add or remove one or more content media items into the list of tracks 368. In some embodiments, the user U can only add content media items having a tempo within the tempo range 366 of the cadence-based playlist 112. In other embodiments, the content media items that are manually added can have a tempo outside the tempo range 366 of the cadence-based playlist 112.

Figure 9:
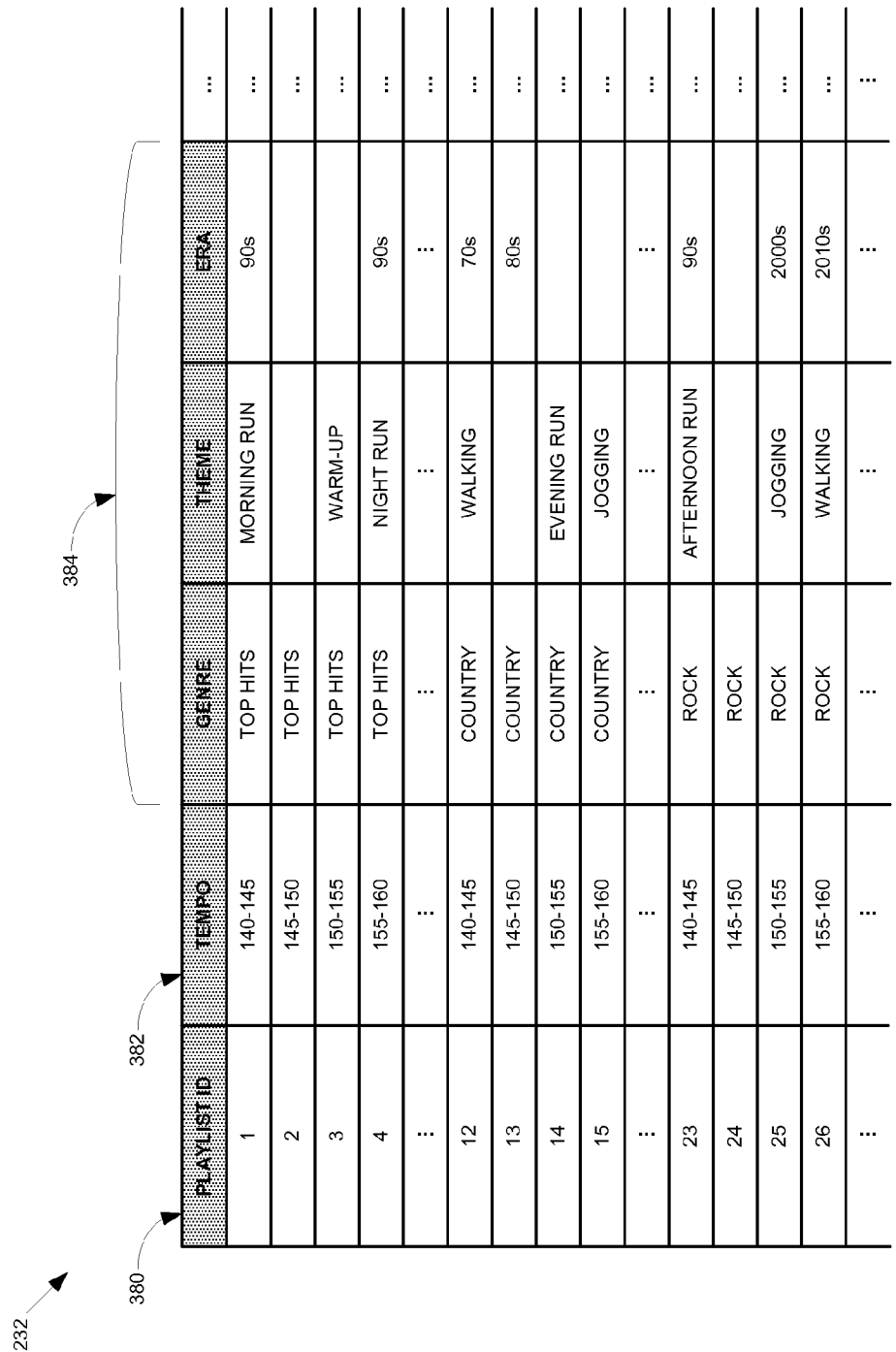
FIG. 9 is an example data structure of repetitive-motion activity media metadata.

FIG. 9 is an example data structure of the repetitive-motion activity media metadata 232. The media metadata 232 can include information about the playlists 216 including the cadence-based playlists 112. In some embodiments, the media metadata 232 contain a playlist ID column 380, a tempo column 382, and one or more playlist characteristics columns 384. In other embodiments, the media metadata 232 can be structured in different manners.

The playlist ID column 380 is used to identify each cadence-based playlist 112. In some embodiments, attributes in the playlist ID column 380 are associated with the playlist ID 360 of the cadence-based playlists 112.

The tempo column 382 is used to identify the tempo ranges 366 associated with the cadence-based playlists 112. Attributes in the tempo column 382 can be determined as described above.

The playlist characteristics columns 384 are used to identify the characteristics of the playlists 112, such as genres, themes, eras, and any other characteristics.

In other embodiments, the media metadata 232 further include a parent playlist column. The parent playlist column is used to identify playlists (e.g., characteristic-based playlists, such as the genre-specific playlists 322, the theme-specific playlists 324, and the era-specific playlists 326) that is parents of the cadence-based playlists 112.

Figure 10:
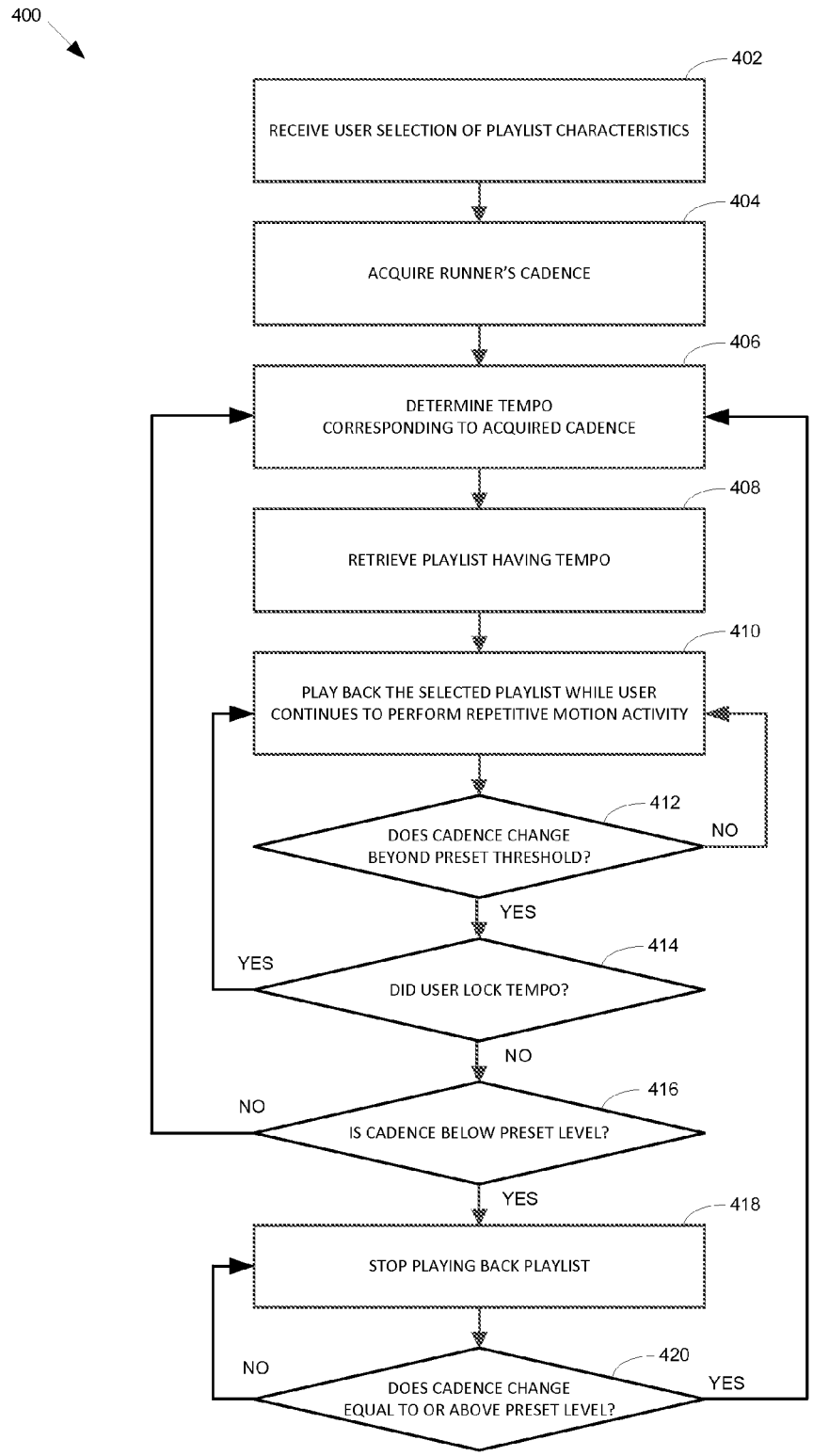
FIG. 10 is a flowchart illustrating an example method of performing an operation of FIG. 3.

FIG. 10 is a flowchart illustrating an example method 400 of performing the operation 304 of FIG. 3. In some embodiments, the method 400 includes operations 402, 404, 406, 408, 410, 412, 414, 416, 418, and 420. In some embodiments, the method 400 is performed using the media-playback device 102. In other embodiments, one or more other computing devices can be used to execute the method 400.

In other embodiments, the operations of the method 400 can be performed in different orders. In yet other embodiments, the method 400 includes additional operations. In yet other embodiments, the method 400 includes only one or some of the operations 402, 404, 406, 408, 410, 412, 414, 416, 418, and 410.

At the operation 402, the media-playback device 102 operates to receive a user selection of one or more playlist characteristics. As described herein, examples of such playlist characteristics include genre, theme, and era. In some embodiments, the media-playback device 102 operates to prompt a user to input the playlist characteristics. For example, the media-playback device 102 can provide a user interface (e.g., a GUI displayed on a touch-sensitive screen) for a user to interact to enter one or more playlist characteristics (e.g., genre) that the user wants to play during a repetitive motion activity (e.g., running) By way of example, before starting running, a user can select a genre of music to which the user wants to listen while the user is running.

At the operation 404, the media-playback device 102 operates to acquire a user's cadence. In some embodiments, the user's cadence is automatically obtained or detected by the media-playback device 102 as the user performs a repetitive motion activity. For example, as a user begins running, the media-playback device 102 detects the user's repetitive motion and calculates the cadence thereof.

In other embodiments, the user's cadence can be manually set before or during the repetitive motion activity. In some examples, the user's cadence can be acquired by prompting a user to select a cadence (i.e., the frequency of the user's repetitive motion) that the user wants to perform during a repetitive motion activity. In other examples, the user's cadence can be acquired by prompting the user to select a tempo (i.e., the frequency of beat in media content items) of a playlist or media content items that the user wants to play back during a repetitive motion activity.

At the operation 406, the media-playback device 102 determines a tempo corresponding to the acquired cadence. In some embodiments, a relationship between a tempo and a cadence, as described herein, is used to convert the acquired cadence to a corresponding tempo.

At the operation 408, the media-playback device 102 operates to retrieve a cadence-based playlist 112 that has a tempo range 366 within which the tempo corresponding to the acquired cadence falls, and the playlist characteristics selected by the user. By way of example, where the user has selected a hip hop music playlist (at the operation 402) and a tempo corresponding to the user's cadence is determined to be about 163 BPM, the media-playback device 102 can retrieve a cadence-based playlist 112 having a genre of hip hop and a tempo range of 160-165 BPM.

In some embodiments, the media-playback device 102 sends a request for the media metadata 232 to the media-delivery system 104, and receives the media metadata 232 from the media-delivery system 104 that transmits it to the media-playback device 102 in response to the request. As some embodiments of the media metadata 232 (as shown in FIG. 9) contain the playlist characteristics information as well as the tempo information, the media-playback device 102 can look up the media metadata 232 and select a proper cadence-based playlist 112 having the selected playlist characteristics (at the operation 402) and the tempo corresponding to the acquired cadence. In other embodiments, where the media-playback device 102 can retrieve one or more cadence-based playlists 112 based on the selected playlist characteristics and the determined tempo (or cadence) from the media-playback device 102 where the cadence-based playlists 112 are stored in the media-playback device 102.

At the operation 410, once a cadence-based playlist 112 corresponding to the acquired cadence has been retrieved, the media-playback device 102 operates to play back the retrieved cadence-based playlist 112 while the user continues to perform the repetitive motion activity. As described herein, the cadence-based playlist 112 identifies one or more media content items having a tempo within the tempo range of the cadence-based playlist 112. Thus, the media-playback device 102 plays back the media content items having a tempo identical to, or similar to, the tempo corresponding to the user's cadence.

At the operation 412, the media-playback device 102 determines whether a cadence has changed beyond a predetermined threshold. Similar to the operation 404, the media-playback device 102 can operate to acquire any change in the user's cadence. In some embodiments, the media-playback device 102 continues to automatically monitor and detect the user's cadence during the repetitive motion activity. In other embodiments, a cadence can change manually by a user who adjusts it (or by adjusting a tempo) in the middle of the repetitive motion activity.

In some embodiments, the predetermined threshold is determined based on the tempo range of the cadence-based playlist 112 that is currently played. In addition, the predetermined threshold is determined based on duration of change in the user's cadence. For example, if the cadence has changed to fall outside the tempo range of the current cadence-based playlist 112 for a predetermined amount of time, it is determined that the cadence has changed beyond the predetermined threshold. By way of example, if the media-playback device 102 is playing back a cadence-based playlist 112 having a tempo range of 150-155 BPM and detects the user's cadence has changed to 166 BPM more than one minutes, then it is considered that the cadence has exceeded the predetermined threshold.

If it is determined that the cadence has not changed beyond the predetermined threshold ("NO" at the operation 412), the method 400 stays at the operation 410 to continue to play back the current cadence-based playlist 112. Otherwise ("YES" at the operation 412), the method 400 moves on to the operation 414.

At the operation 414, the media-playback device 102 determines whether the user has locked the current tempo. In some embodiments, the user can select a certain tempo or cadence to maintain the selected tempo or cadence throughout the entire repetitive motion activity (or at least a portion thereof). If the current tempo has been set to be consistent ("YES" at the operation 414), the method 400 stays at the operation 410 to continue to play back the current cadence-based playlist 112. If not ("NO" at the operation 414), the method 400 moves on to the operation 416.

At the operation 416, the media-playback device 102 determines whether the user's cadence changes below a predetermined level. In some embodiments, the media-playback device 102 is configured to cease to play back media content items if the user stops performing the activity or performs the activity with a cadence lower than a preset level (e.g., when a user stops running temporarily or permanently, or runs slowly). By way of example, if the user runs with a cadence less than 15 BPM, the media-playback device 102 can be configured to stop playing back any playlist. Other examples are also possible.

If it is determined that the user's cadence changes below a predetermined level ("YES" at the operation 416), the method 400 moves on to the operation 418, in which the media-playback device 102 pauses or stops playing back the playlist 112. If not ("NO" at the operation 416), the method 400 returns to the operation 406 to determine a tempo corresponding to the new cadence. Then, the subsequent operations follow, as described above, to play back another cadence-based playlist 112 corresponding to the new cadence.

At the operation 420, after stopping playing back a playlist, the media-playback device 102 determines whether a cadence has changed to be equal to, or above, the predetermined level as described in the operation 416. If so ("YES" at the operation 420), the method 400 returns to the operation 406, in which the media-playback device 102 operates to determine a tempo corresponding to the new cadence. Then, the subsequent operations follow, as described above, to play back another cadence-based playlist 112 corresponding to the new cadence. If it is determined that a cadence has not changed to the predetermined level, the method 400 stays at the operation 418 to continue to stop playing back a playlist.

As noted previously, although many of the examples provided above are described with respect to running, other embodiments relate to other repetitive motion activities as well such as cycling, swimming, and rowing.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. It is to be understood that a numerical range is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

The various examples and teachings described above are provided by way of illustration only and should not be construed to limit the scope of the present disclosure. Those skilled in the art will readily recognize various modifications and changes that may be made without following the example examples and applications illustrated and described herein, and without departing from the true spirit and scope of the present disclosure.

What is claimed is:

1. A method of automatically playing back one or more media content items to support a repetitive motion activity, the method comprising:
generating, using at least one computing device, a plurality of cadence-based playlists for a predetermined range of cadence values by:
creating the plurality of cadence-based playlists, the plurality of cadence-based playlists associated with subsets of the predetermined range of cadence values, respectively;
identifying tempi of media content items;
associating the media content items with the plurality of cadence-based playlists, respectively, based on the tempi of the media content items, each cadence-based playlist including one or more of the media content items with the tempi of the one or more of the media content items corresponding to the subset of the predetermined range of cadence values of that playlist; and
storing the plurality of cadence-based playlists;
after generating the plurality of cadence-based playlists, acquiring, using a media-playback device, a user's cadence associated with the repetitive motion activity;
sending a request based on the user's cadence from the media-playback device to the at least one computing device to cause the at least one computing device to select one of the plurality of cadence-based playlists, the selected playlist being associated with a subset of the predetermined range of cadence values within which the acquired user's cadence falls;
retrieving from the at least one computing device data usable to initiate playback of media content items associated with the selected one of the plurality of cadence-based playlists, using the media-playback device; and
playing back the selected one of the plurality of cadence-based playlists on the media-playback device.

2. The method of claim 1, wherein acquiring a user's cadence includes obtaining a user selection of a tempo, the tempo defining the user's cadence.

3. The method of claim 1, further comprising:
determining, using the media-playback device, a tempo corresponding to the cadence,
wherein retrieving a playlist associated with the cadence includes retrieving a playlist associated with the tempo.

4. The method of claim 1, further comprising:
receiving a user selection of playlist characteristics, wherein retrieving a playlist associated with the tempo includes retrieving a playlist associated with the playlist characteristics.

5. The method of claim 4, wherein the playlist characteristics include at least one of genre, theme, and era of a playlist.

6. The method of claim 1, further comprising:
determining whether the cadence has changed to a second cadence beyond a threshold;
if the cadence has changed to the second cadence beyond the threshold, retrieving a second playlist associated with the second cadence; and
playing back the second playlist.

7. The method of claim 6, further comprising:
if the cadence has not changed beyond the threshold, continuing to play back the playlist.

8. The method of claim 1, further comprising:
determining that the cadence is below a predetermined level; and
stopping play back of the playlist.

9. The method of claim 8, further comprising:
determining that the cadence is equal to, or above, the predetermined level; and
playing back a playlist associated with the cadence.

10. The method of claim 1, further comprising:
determining whether the tempo is manually locked; and
if the tempo is manually locked, playing back the playlist associated with the tempo regardless of change in the cadence.

11. The method of claim 1, wherein generating a plurality of cadence-based playlists further includes:
identifying the predetermined range of cadence values;
dividing the predetermined range of cadence values to the subsets; and
associating one or more of the plurality of cadence-based playlists with each of the sub sets.

12. A method of generating cadence-based playlists to support a repetitive motion activity, the method comprising:
creating a plurality of cadence-based playlists, the plurality of cadence-based playlists associated with subsets of a predetermined range of cadence values, respectively;
identifying tempi of the media content items;
associating the media content items with the plurality of cadence-based playlists, respectively, based on the tempi of the media content items, each cadence-based playlist including one or more of the media content items with the tempi of the one or more of the media content items corresponding to the subset of the predetermined range of cadence values of that playlist;
storing the plurality of cadence-based playlists;
after storing the plurality of cadence-based playlists, receiving a request from a media-playback device based on a cadence associated with the repetitive motion activity;
selecting one of the plurality of cadence-based playlists based on the request, the selected playlist being associated with a subset of the predetermined range of cadence values within which the cadence associated with the repetitive motion activity falls; and
sending data usable to initiate playback of media content items associated with the selected cadence-based playlist.

13. The method of claim 12, wherein the cadence-based playlists are associated with one or more playlist characteristics.

14. The method of claim 13, wherein the playlist characteristics include at least one of genre, theme, and era of a playlist.

15. The method of claim 12, wherein the tempo ranges are defined at predetermined intervals.

16. A computer-readable storage medium comprising software instructions that, when executed, cause one or more computing devices to:
generate a plurality of cadence-based playlists for a predetermined range of cadence values by:
creating the plurality of cadence-based playlists, the plurality of cadence-based playlists associated with subsets of the predetermined range of cadence values, respectively;
identifying tempi of media content items;
associating the media content items with the plurality of cadence-based playlists, respectively, based on the tempi of the media content items, each cadence-based playlist including one or more of the media content items with the tempi of the one or more of the media content items corresponding to the subset of the predetermined range of cadence values of that playlist; and
storing the plurality of cadence-based playlists;
after generating the plurality of cadence-based playlists, acquire a user's cadence associated with a repetitive motion activity;
send a request to select one of the plurality of cadence-based playlists based on the user's cadence, the selected playlist being associated with a subset of the predetermined range of cadence values within which the acquired user's cadence falls;
retrieve data usable to initiate playback of media content items associated with the selected one of the plurality of cadence-based playlists; and
play back the selected one of the plurality of cadence-based playlists.

17. The computer-readable storage medium of claim 16, wherein the software instructions further causes the one or more computing devices to:
obtain a user selection of a tempo to define the user's cadence.

18. The computer-readable storage medium of claim 16, wherein the software instructions further causes the one or more computing devices to:
receive a user selection of playlist characteristics;
wherein the playlist associated with the cadence is associated with the selected playlist characteristics.

19. The computer-readable storage medium of claim 16, wherein the software instructions further causes the one or more computing devices to:
determine whether the cadence has changed to a second cadence, the second cadence corresponding to a tempo beyond the tempo range of the playlist;
if the cadence has changed to the second cadence, retrieving a second playlist associated with the second cadence, the second playlist associated with a second tempo range and including one or more second media content items with tempi of the second media content items within the second tempo range; and
play back the second playlist.

20. The computer-readable storage medium of claim 16, wherein the software instructions further causes the one or more computing devices to:
determine that the cadence is below a predetermined level; and stop play back of the playlist on the one or more computing devices.

\* \* \* \* \*